(12) United States Patent
Bastian et al.

(10) Patent No.: US 11,318,906 B2
(45) Date of Patent: May 3, 2022

(54) FORCE DISTRIBUTING PROGRESSIVE AIRBAG SYSTEM

(71) Applicant: Hy-Tek Mfg. Co. Inc, Sugar Grove, IL (US)

(72) Inventors: John C. Bastian, Yorkville, IL (US); John D. Jude, Scottsdale, AZ (US); David O. Saxon Carver, Sugar Grove, IL (US); Donald C. Middlebrook, Deerfield, IL (US)

(73) Assignee: HY-TEK MFG. CO. INC, Sugar Grove, IL (US)

( * ) Notice: Subject to any disclaimer, the term of this patent is extended or adjusted under 35 U.S.C. 154(b) by 0 days.

(21) Appl. No.: 16/913,193

(22) Filed: Jun. 26, 2020

(65) Prior Publication Data

US 2021/0078520 A1 Mar. 18, 2021

Related U.S. Application Data

(60) Provisional application No. 62/867,208, filed on Jun. 26, 2019.

(51) Int. Cl.
*B60R 21/231* (2011.01)
*B60R 21/233* (2006.01)
*B60R 21/214* (2011.01)
*B60R 21/261* (2011.01)
*B60R 21/00* (2006.01)

(52) U.S. Cl.
CPC .......... *B60R 21/231* (2013.01); *B60R 21/214* (2013.01); *B60R 21/233* (2013.01); *B60R 21/261* (2013.01); *B60R 2021/0018* (2013.01); *B60R 2021/23107* (2013.01); *B60R 2021/23192* (2013.01); *B60R 2021/2615* (2013.01)

(58) Field of Classification Search
CPC ..... B60R 21/13; B60R 21/214; B60R 21/231; B60R 21/233; B60R 2021/0018; B60R 2021/0048; B60R 2021/0442; B60R 2021/138; B60R 2021/23107; B60R 2021/23192; B60R 2021/2615; B60R 21/261
See application file for complete search history.

(56) References Cited

U.S. PATENT DOCUMENTS 5,607,180 A * 3/1997 Kornhauser ............ B60R 21/02
280/736
5,775,726 A * 7/1998 Timothy ................ B60R 21/013
280/730.1

(Continued)

*Primary Examiner* — Laura Freedman
(74) *Attorney, Agent, or Firm* — McDonald Hopkins LLC (57) ABSTRACT

A closed or sealed airbag system is described in which a semi-rigid, resilient force distribution plate is positioned proximate a pair of relatively flat inflatable airbags. Once inflated, the airbags retain the gas/fluid provided thereto, while the plate serves to redistribute a point of impact on the system across the entirety of the air bags so as to significantly reduce impact forces that otherwise would have been sustained by the object/person causing the initial point of impact. The airbags and plate are specifically engineered with features to distribute and dissipate force across their entire surface area, resulting in distributed deceleration of point load forces. Additional airbags and plates can be incorporated, including outer most plates on the outer facings of the system.

17 Claims, 4 Drawing Sheets

(56) References Cited

U.S. PATENT DOCUMENTS

| | | | | |
|---|---|---|---|---|
| 6,065,167 | A * | 5/2000 | Gancy | A47C 27/081 |
| | | | | 5/655.3 |
| 7,540,531 | B2 * | 6/2009 | Sakakibara | B60R 21/206 |
| | | | | 280/728.3 |
| 9,243,850 | B1 | 1/2016 | Bastian | |
| 9,970,712 | B2 | 5/2018 | Bastian | |
| 9,994,182 | B1 * | 6/2018 | Jaradi | B60R 21/232 |
| 10,471,924 | B2 * | 11/2019 | Min | B60R 21/233 |
| 10,974,679 | B2 * | 4/2021 | Sommer | B60J 7/1642 |
| 2003/0197354 | A1 * | 10/2003 | Beland | B60R 13/0225 |
| | | | | 280/730.1 |
| 2006/0290113 | A1 * | 12/2006 | Bernat | B60R 21/231 |
| | | | | 280/730.1 |
| 2017/0072889 | A1 * | 3/2017 | Whitens | B60R 21/04 |
| 2018/0022308 | A1 * | 1/2018 | Kunisada | B60R 21/23138 |
| | | | | 280/730.2 |
| 2018/0022309 | A1 * | 1/2018 | Kunisada | B60R 21/26 |
| | | | | 280/730.2 |

* cited by examiner

FORCE DISTRIBUTING PROGRESSIVE AIRBAG SYSTEM

CROSS REFERENCE TO RELATED APPLICATIONS

This application claims priority to U.S. Provisional Patent Application Ser. No. 62/867,208 filed on Jun. 26, 2019, the entirety of which is incorporated by reference.

This invention was made with Government support under contract W56HZV-17-C-0093 awarded by the United States Army. The Government has certain rights in this invention.

FIELD OF INVENTION

The present invention relates to airbag systems and more particularly to a progressive airbag system in which at least one semi-rigid, resilient force distribution plate is positioned proximate a pair of thin, flat inflatable airbags. Once inflated, the airbags retain the gas/fluid provided thereto, while the plate or plates serve to redistribute a point of impact on the system across the entirety of the air bags (and, when employed, additional plates) so as to significantly reduce impact forces that otherwise would have been sustained by the object/person causing the initial point of impact. The airbags and plates are specifically engineered with features to distribute and dissipate force across their entire surface area, resulting in distributed deceleration of point load forces.

BACKGROUND

Currently, the two most familiar means of providing vehicle interior surface impact injury protection to the occupants of moving vehicles are the seat belt and airbag. While both devices are installed in every new commercial car and truck manufactured today, each plays a unique role in preventing impact and crash related injuries and when used together by vehicle occupants this combination saves thousands of lives each day. Modern vehicle seat belts protect occupants in several ways:

- seat belts increase the time it takes occupants to come to a complete stop within the vehicle during a collision;
- seat belts spread impact force over a greater area of the body, particularly the waist, chest, abdomen and shoulder;
- seat belts minimize occupant contact with the interior of the vehicle upon collision momentum transfer; and
- seat belts aid prevention of occupant ejection from the vehicle.

When combined with seat belt restraints, vehicle airbags provide enhanced occupant protection in cases where high speed collisions result in rapid bodily deceleration that would otherwise occur against rigid structures of the vehicle interior i.e. dashboard, windshield, door panels and roof. In these instances airbag deployment and inflation occurs only milliseconds after impact and prolongs the rate of bodily deceleration by carrying the occupant on its pressurized surface as it deflates under impact forces. Importantly, such airbags are configured so that the large surface area of the occupant's moving head, neck, and torso distributes those impact forces over a large area of the bag surface.

While the combination of vehicle seat belt restraints and inflatable airbags works well for characteristic front, rear, and side impact collisions, there are currently no commercial vehicles equipped with airbags that protect the head and neck from acute injury related to impact with the vehicle roof, door panels, headrest or other surfaces. These types of head and neck impacts, which include post impact whiplash, secondary collision impacts i.e. multiple vehicle collisions, and vehicle rollover events among others, is unique in that the head is a distinctive point load that will not distribute impact forces across large areas of an inflated airbag. Additionally, these vehicle interior surfaces of interest provide little space claim on which to mount characteristically large airbag restraints.

Further, conventional airbag systems are typically engineered to operate within a pressure gradient. That is, the system quickly inflates but includes valves or structures to allow the bag to deflate as impact is made. In this manner, the system absorbs energy and provides for constant deceleration. However, this approach means that the bag is only useful in absorbing an initial impact and, because the bag deflates thereafter, it offers little to no protection for repeated impacts (as may be expected in a rollover crash).

Accordingly, there is a need in the art for a compact airbag system that can be utilized to provide additional protection from a wide range of impacts including, but not limited to, head and neck impacts, secondary collision impacts (e.g., multiple vehicle collisions), vehicle rollover events, etc. These protections would be particularly useful in a low-profile airbag system installed in the rooftop of a vehicle along its passenger-facing sides.

SUMMARY OF INVENTION

The present invention relates to airbag systems and more particularly to progressive airbag system. In one embodiment, the present invention relates to an airbag system that comprises at least two airbag structures separated by a semi-rigid force distribution plate, where such a plate is located between a first and second airbags of the airbag system. Additional semi-rigid force distribution plates (e.g., where the arrangement of the at least two airbag structures and the at least two semi-rigid force distribution plates are arranged in an alternating cross-sectionally stacked pattern) and/or airbags are possible. Notably, the plates are semi-rigid, resilient, and elastically deformable so as to distribute point of contact loads across a broader surface area, while the airbags remain sealed after inflation and can be provided with structures to better accommodate deformation.

In another embodiment, the present invention relates to an airbag enclosure, the airbag enclosure designed to encompass an airbag system comprising: a first airbag structure, wherein the first airbag structure when deflated has a top surface and a bottom surface; a second airbag structure, wherein the second airbag structure when deflated has a top surface and a bottom surface; and a semi-rigid force distribution plate, wherein the first semi-rigid force distribution plate is located between the top of the first airbag structure and the bottom of the second airbag structure, wherein the airbag system is designed to be mounted on the bottom, or inside, surface of a vehicle roof. Such mounting may be accomplished by any conventional means, including hook-and-loop connectors, fasteners, cooperating fittings, adhesives, and other similar means.

In another embodiment, the present invention relates to an airbag system comprising: a first airbag structure, wherein the first airbag structure when deflated has a top surface and a bottom surface; a second airbag structure, wherein the second airbag structure when deflated has a top surface and a bottom surface; a semi-rigid force distribution plate, wherein the first semi-rigid force distribution plate is located between the top of the first airbag structure and the bottom of the second airbag structure; and an optional mounting plate, wherein the mounting plate is located on the top surface of the second airbag structure, wherein the airbag system is designed to be mounted on the bottom, or inside, surface of a vehicle roof or other rigid structure.

In other embodiments (complimentary to or distinct from those disclosed above), the airbag system includes manifolds to allow for quick inflation based upon information received from the vehicle communication bus and/or other sensors positioned at key contact points on the vehicle or its exterior. The manifold may connect to a rapidly deploying gas/fluid generator, possibly by means of energetic or chemical combustion modules or through the use of pressurized cartridges or cylinders. To the extent the generator is external to the airbag(s) and/or manifold, check valve or other appropriate structure are provided to ensure the airbags remain inflated. Still other aspects and embodiments are possible, as described herein.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. Unless noted to the contrary, all tests, procedures, and measurements are at ambient conditions relying upon common conventions within the field of interest (e.g., wt. %, metric units, etc.). The materials, methods, and articles disclosed herein are illustrative only and not intended to be limiting.

The singular forms "a," "an," and "the" include plural referents unless the context clearly dictates otherwise. As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Also, unless indicated to the contrary, the numerical values in the specification should be understood to include numerical values which are the same when reduced to the same number of significant figures and numerical values which differ from the stated value by less than the experimental error of the conventional measurement technique of the type used to determine the particular value. Any range of values is inclusive of the recited endpoint and independently combinable (e.g., "from 2 to 10" is inclusive of the endpoints, 2 and 10), and intervening numbers within that range are explicitly contemplated in any combination (e.g., for the stated range 6-9, 7 and 8 are disclosed, as are the ranges 7-9, 6-8, 7-8, and so forth).

The present invention relates to airbag systems and more particularly to progressive airbag system. In one embodiment, the present invention relates to an airbag system that comprises at least two airbag structures separated by a semi-rigid force distribution plate, where such a plate is located between a first and second airbags of the airbag system. In another embodiment, the present invention relates to an airbag system that comprises at least two airbag structures together with at least two semi-rigid force distribution plates, where the arrangement of the at least two airbag structures and the at least two semi-rigid force distribution plates are arranged in an alternating cross-sectional pattern of at least one a first rigid force distribution plate, a first airbag structure, a second semi-rigid force distribution plate and a second airbag structure.

In a further embodiment, the present invention relates to an airbag enclosure, the airbag enclosure designed to encompass an airbag system comprising: a first airbag structure, wherein the first airbag structure when deflated has a top surface and a bottom surface; a second airbag structure, wherein the second airbag structure when deflated has a top surface and a bottom surface; and a semi-rigid force distribution plate, wherein the first semi-rigid force distribution plate is located between the top of the first airbag structure and the bottom of the second airbag structure, wherein the airbag system is designed to be mounted on the bottom, or inside, surface of a vehicle roof or other rigid structure.

In another embodiment, the present invention relates to an airbag system comprising: a first airbag structure, wherein the first airbag structure when deflated has a top surface and a bottom surface; a second airbag structure, wherein the second airbag structure when deflated has a top surface and a bottom surface; a semi-rigid force distribution plate, wherein the first semi-rigid force distribution plate is located between the top of the first airbag structure and the bottom of the second airbag structure; and a mounting plate, wherein the mounting plate is located on the top surface of the second airbag structure, wherein the airbag system is designed to be mounted on the bottom, or inside, surface of a vehicle roof or other rigid structure.

In still another embodiment, the present invention relates to an airbag system comprising: a first airbag structure, wherein the first airbag structure when deflated has a top surface and a bottom surface; a second airbag structure, wherein the second airbag structure when deflated has a top surface and a bottom surface; a first semi-rigid force distribution plate, wherein the first semi-rigid force distribution plate is located on the bottom surface of the first airbag structure; and a second semi-rigid force distribution plate, wherein the second semi-rigid force distribution plate is located between the top of the first airbag structure and the bottom of the second airbag structure, wherein the airbag system is designed to be mounted on the bottom, or inside, surface of a vehicle roof or other rigid structure.

In still another embodiment, the present invention relates to an airbag system comprising: a first airbag structure, wherein the first airbag structure when deflated has a top surface and a bottom surface; a second airbag structure, wherein the second airbag structure when deflated has a top surface and a bottom surface; a first semi-rigid force distribution plate, wherein the first semi-rigid force distribution plate is located on the bottom surface of the first airbag structure; a second semi-rigid force distribution plate, wherein the second semi-rigid force distribution plate is located between the top of the first airbag structure and the bottom of the second airbag structure; and a mounting plate, wherein the mounting plate is located on the top surface of the second airbag structure, wherein the airbag system is designed to be mounted on the bottom, or inside, surface of a vehicle roof or other rigid structure.

A method of reducing injuries in vehicle impact collisions is also contemplated. Here, at least one semi-rigid force distribution plate is interposed between substantially planar air bags. Based upon impact, collision, or other sensory data, the airbags are rapidly inflated and sealed, so that force of a single point impact is distributed and dissipated or absorbed across the entire surface area of the air bag, as well through the thickness of each airbag and semi-rigid plate. The airbags and/or semi-rigid plates can be provided with resilient and/or elasctically deformable formations across their respective surface areas. The inflation may be by way of energetic combustion and/or release of compressed and/or pressurized gas from a vessel such as a cartridge or cylinder.

It should be noted that although the Figures illustrate an embodiment of the invention that comprises at least two airbag structures interspersed with at least two semi-rigid force distribution plates, the present invention is not limited solely thereto. Instead, the present invention is to be broadly construed in accordance with the various embodiments described above.

In light of the above, a discussion of the physics relating to impacts is discussed below. The physics that describe high velocity bodily impacts on rigid vehicle structures also defines that acute or fatal injuries are generally the result of rapid deceleration of the human body against those rigid structures. A deceleration injury, or injuries, is/are caused when the momentum transferred to the human body through vehicle travel motion or an applied external force such as an IED (improvised explosive device) or AVL blast, is brought to a sudden halt.

Acceleration and deceleration forces can be measured in terms of gravitational acceleration (G). A force of three G's, for example, is equivalent to acceleration three times that of a body falling near the Earth. The primary factor that influences impact G-force, and the resulting degree of deceleration injury, is time duration over which deceleration occurs. As a rule, the longer the duration over which bodily deceleration against a surface occurs, the lower the risk of fatal injury. To achieve this goal, vehicle safety engineers typically endeavor to increase the time duration over which body deceleration occurs in order to reduce the G-force that vehicle occupants experience during an impact event. For example, consider a race car driver traveling at 155 mph (227 ft/s) crashing into a wall and coming to rest, or zero mph, in 1.0 seconds. The driver's average deceleration would be (227−0 ft/s)/1.0 s=227.0 ft/s$^2$. G-force is determined by dividing average deceleration by the acceleration due to gravity (32.0 ft/s$^2$). Therefore the driver would experience 227.0/32.0=7.1 G's. By this same calculation, if the duration of deceleration were to be extended over 2.0 seconds, the driver would experience only 3.5 G's. In commercial vehicles, inflatable airbags have successfully facilitated a lifesaving increase in the duration of bodily deceleration resulting from impacts or collisions.

To address this critical capability gap, the present invention utilizes two or more thin, geometrically symmetric and independent airbags that, depending on the application, may or may not be in hydraulic communication. The two or more inflatable airbags are integrated together in a sandwich configuration comprised of a bottom semirigid impact force distribution plate of an appropriately specified thickness and flexibility, a bottom inflatable airbag, a middle semi-rigid impact force distribution plate of an appropriately specified thickness and flexibility, a top inflatable airbag and a vehicle interior surface mounting plate. Importantly, when the two or more airbags are deflated for storage the structure collapses into a thin sheet-like form factor that is inconspicuous and unobtrusive.

As used herein, semi-rigid plate means a substantially flat, planar panel that retains its shape under non-stressed conditions (e.g., the system is not inflated and/or in its normal, mounted position on the interior roof/top of the passenger compartment of a vehicle). However, the materials selection is such so that the panel will deform when impacted with sufficient force. In this manner, the semi-rigid plates are analogous to well known "crumple" panels or zones used on the exterior of vehicles to partially absorb impacts although, here, the semi-rigid plates are engineered to elastically deform under conditions/forces expected when at least one average sized human is ejected upward into contact with the panel.

Further semi-rigid plates may be resilient. This means that they will return to their original form so as to allow for protection against repeated impacts.

Both resiliency and elastic deformation may be based on a combination of traits and factors. By way of example rather than limitation, one or more raised domes, corrugations, or alternating projections and depressions can be formed singly or across the entire surface area of the plate. Resilience and elastic deformation can also be imparted through the choice of material selection and/or combinations of materials. Finally, the peripheral shape, anchoring, and general positioning of the panels within the airbag "stack" (i.e., the alternating layers of bags and plates) might further enhance the plate's intended performance as a force distribution and dissipation device.

The semi-rigid plates may be constructed from appropriate metals, preferably sturdy, light weight, and cost effective. Examples might include aluminum, steel, titanium, and other common alloys thereof. The plates may also be made from common industrial polymers, such as polypropylene, polyurethane, polyamides (e.g., nylon), polyethylene, acrylics, and/or polyvinyl chlorides. Still other suitable materials might include carbon fiber, fiber composites, wood composites, or any two or more layer combination of any two or more of these materials (collectively, "a laminate plate"). Thus, each layer of such laminate plate can be independently formed from any of the types of materials listed above and/or combinations of materials can be used to create multi-layered semi-rigid force distribution plates where each individual plate is comprised of two or more separate layers bonded together to yield a desired structure having a suitable rigidity.

In function, the semi-rigid plates absorb and distribute impact forces over a much wider surface area than the initial point of contact. By layering these plates proximate to and between inflatable air bladders, the system is able to distribute impact forces in a manner that minimizes severe traumatic injuries. Additionally, because the airbags are closed and do not deliberately deflate, the resilient and/or elastically deformable nature of the plates ensure the benefits of the system will be realized over repeated impacts, as might be expected in a vehicle rollover.

Figure 1:
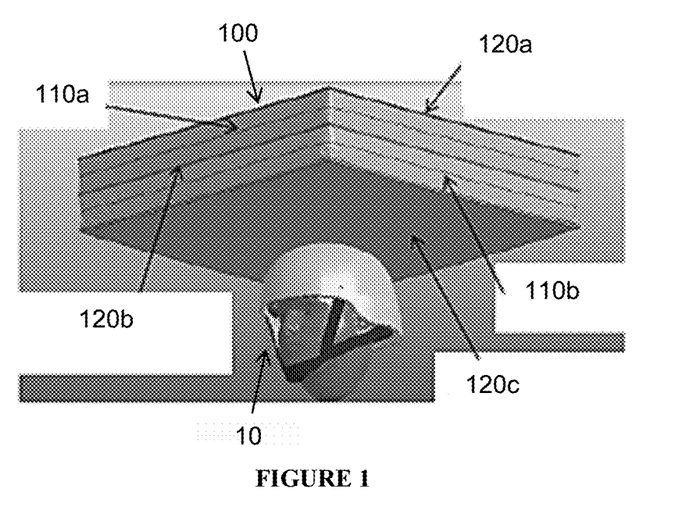
FIG. 1 is a cross-sectional schematic illustration of an aspect of the invention in an inflated state just prior to impact by the human head point load.

Like a traditional airbag system, inflation of the structure of the invention occurs when existing and proven airbag accelerometer/impact sensor technology and integrated circuit logic are combined to detect underbody, front, rear, side, oblique, or rollover vehicle impact forces. FIG. 1 schematically illustrates the system 100 as it inflates but prior to impact, while FIG. 2 shows system 100 as the impact force from a passenger 10 is distributed across the system components, all described in greater detail below.

Generally speaking, system 100 consists of alternating layers of airbags 110 and semi-rigid plates 120. As shown in FIGS. 1 and 2, airbags 110 are activated and inflated, but in airbags 110 are specifically designed to be significantly thinner (e.g., less than one third their inflated size or as is otherwise is common in this field) when not inflated.

Figure 2:
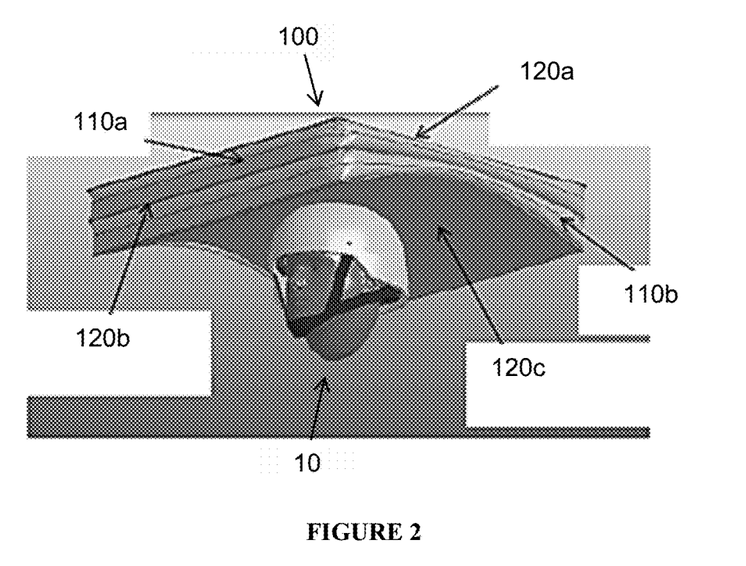
FIG. 2 is a cross-sectional schematic illustration similar to FIG. 1 so as to highlight the beneficial distribution of impacts forces that is facilitated when head (point load) shortly after impact.

While elements 110 and 120 are generically referred to for purposes of FIGS. 1 and 2, it will be understood that each individual component need not be identical to the others in the system 100. For example, the top-most plate 120a may be modified along its top-facing (i.e., the opposite facing from that disposed toward passenger 10) for attachment to the interior roof panel of the passenger compartment of the vehicle. Similarly, the bottom or passenger-facing side of plate 120c may be modified for aesthetics and/or with additional foam padding. The middle plate 120b could be comparatively thicker than the bottom plate 120c and/or top plate 120a to provide better force distribution (this would also enable bottom plate 120c to have more pliable/less semi-rigid characteristics). Similarly, airbags 110a, 110b could be identical or the bottom bag 110b could be thicker for better initial force absorption/deceleration of the passenger 10 coming into contact with it.

On impact with the inflated structure the head produces a point load on the bottom semi-rigid impact force distribution plate. By means of its material properties, the semi-rigid bottom plate therein distributes that point load across a large surface area of the inflated bottom airbag. The inflated bottom airbag (and, possibly, the plate) deforms uniformly in response to that distributed impact load stress, therein facilitating the subsequent deformation of the middle semi-rigid impact force distribution plate. That plate, by means of its material properties, further distributes that impact stress across the large surface area of the inflated top airbag. The result of the initial point load impact of the head against the inflated invention is that impact forces are progressively distributed over an incrementally larger surface area the two adjacent gas pressure inflated and elastically deformable airbags which, by their physical deformation, reduce the rate at which head deceleration occurs.

As used herein, "progressive" means that the force distribution of the system widens and improves as increasing layers/airbags/plates provided, even when the layers/airbags/plates have the same or substantially the same shapes and surface areas. It should also be noted that, as a consequence of this progressive distribution, it is possible—if not likely—that the elastic deformation of individual plates will differ based upon the impact.

Notably, the airbags are designed to remain inflated. As such, the bags do not necessarily have a prismatic shape. Indentations, voids, contours, and the like can be employed to ensure the airbags deform without bursting. In this regard, the material selection of the airbag should prioritize elastic deformation but with sufficient strength to avoid rupture or unwanted tearing.

In some embodiments, the airbags will have a square or rectangular shape, although any peripheral shape is possible, so long as it substantially matches or accommodates the other plates and bags within the system. The thickness of each bag is relatively small in comparison to any dimension of its perimeter. As such, the bags will have a substantially flat and planar presentation, although the precise inflated thickness will depend on additional factors such as anticipated impact forces; constructions, positioning, and performance of the semi-rigid plates; the number of airbags and plates contained within the system; and other similar factors. Conversely, in its un-inflated state, it would be preferable for the airbags and the entire system to have as thin a presentation as possible relative to the axis of anticipated impact (e.g., when installed in a row, the height of the system should be minimized).

As a non-limiting example, the system may rely upon a square or rectangular shaped set of airbags, with one similar-shaped, semi-rigid plate disposed therebetween. When each airbag has a normalized, inflated surface area of 550-600 squared units, the preferred, inflated thickness can be between 1.5 to 3.5 units, thereby recommending a ratio of anywhere between approximately 180 square units of surface are per unit of thickness and 400 square units of surface area per unit of thickness. However, the precise dimensions will be determined by the factors noted above, and the surface area of each inflated airbag will be at least one, at least two, at least three, or at least four orders of magnitude smaller than the thickness of each bag and/or the thickness of the system. In this manner, the current closed, planar airbag system, designed specifically for small impact point of contact, can be distinguished from deflating, balloon-style airbags intended for large impact points of contact, with the large surface area and relatively small thickness (coupled with elastic deformation and/or resilience of the components) significantly more capable of distributing forces.

In some embodiments, closed cell foams may be used in addition to or in place of inflatable bags. These foams would provide a media for capturing and retaining the gas/fluid introduced into the system, while simultaneously providing greater flexibility in helping form and retain more complex, contoured shapes for the impact surface (although the semi-rigid force distribution plates should have cooperating form/shape as well).

FIG. 2 schematically illustrates the beneficial distribution of impacts forces that is facilitated when head (point load) impacts the inflated invention. A particularly important distinction between the invention described herein and traditional vehicle mounted airbag restraints is that both adjacently positioned airbags of the present invention are designed to prolong the duration of pressurized gas inflation over a period of between about 6 to about 12 seconds (although longer or shorter inflation times could be utilized depending on the intended end use for the airbag system of the present invention). This functional distinction facilitates prolonged head and neck injury protection during impacts involving complex collisions and deceleration dynamics including, but not limited to, (i) sequential collisions involving multiple vehicles that occur over prolonged periods; (ii) collisions that result in subsequent vehicle rollover or multiple rollovers; (iii) multi-vehicle "pile-up" collisions; and (iv) military combat-related impacts involving underbody Improvised Explosive Device (IED) or Anti-Vehicle Landmine (AVL) detonation.

An additional feature of the present invention is that each adjacently positioned gas pressurized airbag can be configured so that each is pressurized independent of the other, therein allowing the invention to operate on the basis of deceleration rate as a function occupant safety requirements (i.e., occupant protection in a passenger vehicle traveling at highways speeds (50 to 85 mph) versus occupant protection in a high speed race car (100 to 200 mph)). It may be possible to provide system 100 with a microprocessor or controller that is directly connected into the vehicle's internal systems (positioning of the microprocessor can be proximate to the vehicle's systems or placed directly proximate to the airbags 110 or other system 100 components where it is installed in the passenger compartment/roof top). In this manner, activation of the system 100 (specifically including deployment of the airbags 110, in terms of timing and/or inflation rate) can depend upon vehicle speed, orientation, and other information inherent to that vehicle's operation, sensors, and/or other characteristics.

While not wishing to be limited thereto, impact testing reveals that the invention detailed herein transfers force across the full width of the airbag structures while producing very little balloon effect (i.e., a deliberate pressure gradient) that is exhibited by traditional air bag technology. This result is an extremely valuable feature considering that reduction in the rate of deceleration of the human head point load during vehicle collision related impacts is the primary objective of its development. A prime example of this effect is the human head impacting the roof of a vehicle during a rollover event. Since traditional air bags are designed to reduce the rate of deceleration during interactions with a large impact surface area (e.g., the torso, shoulder and arms, and chest and head), they are ineffective in reducing the rate of deceleration during impact with small impact surface areas (or point loads), such as the human head. Such impacts scenarios have proven to result in point loads, readily penetrating inflated airbags and impacting underlying rigid interior vehicle surfaces with fatal deceleration rates.

In one embodiment, the design of the present invention which is comprised of two or more low profile inflatable air bags sandwiched between layers of deformable semi-rigid sheets, facilitates a beneficial reduction in the rate of head deceleration by means of improved impact force distribution across each airbag surface, independent and tailorable gas pressurization of each airbag, uniform deformation of each inflatable airbag, and prolonged duration of pressurized gas inflation versus current state-of-the-art vehicle airbag restraint technology. This highly disruptive method of impact force distribution both dramatically improves air bag performance and minimizes overall vehicle airbag size and complexity.

To illustrate the performance of the invention, testing in which a head-shaped form weighing approximately 25 pounds is dropped from a tower onto a prototype of the system 100 is dropped onto a conventional 5 inch thick inflated airbag 110 at 15 ft/s, the head-shaped form "bottoms out" against the hard base surface beneath the airbag. The resultant "G" force transmitted to the head is over 2000 G's. The same test is then performed with a 3 inch thick inflated prototype of present invention in accordance with the embodiments illustrated herein and the resulting G forces measured during impact of the head form atop the inflated invention is less than 100 G's, an approximate 2000 percent improvement in performance.

Turning to FIGS. 3 through 6, various aspects of a more detailed embodiment of airbag system 200 are shown. Here, the semi-rigid plates 220 include an optional mounting plate 221 with an increased thickness in comparison to force distribution plates 222 and 223. When used, the mounting plate may attach to the vehicle surface (e.g., interior passenger compartment roof, seat back or dashboards facing a passenger, sidewalls or solid door panels, etc.) by way of any conventional means, including but not limited to hook-and-loop style fabric connectors (e.g., VELCRO®), fasteners, cooperating fittings (e.g., snap-fitting formations), adhesives, and the like. However, it may be possible to install the system without a mounting plate simply be relying upon the extant compressive force created when the interior cover (e.g., roof panel) is attached to the frame or corresponding exterior feature of the vehicle.

Figure 3:
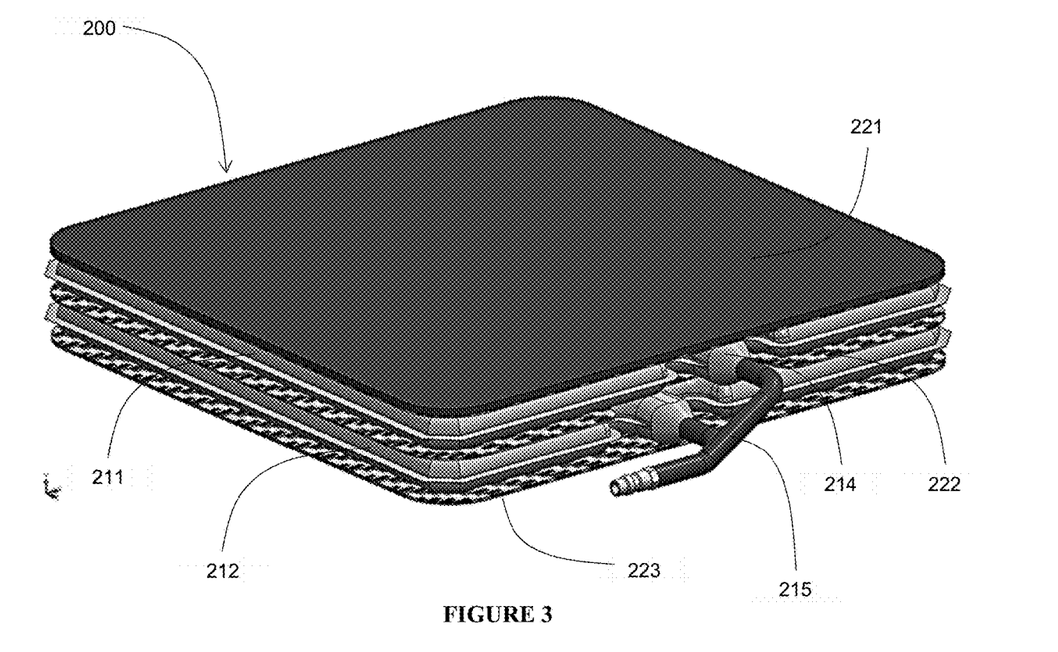
FIG. 3 is cross sectional, perspective view of a further aspect of the inventive system.
Figure 4:
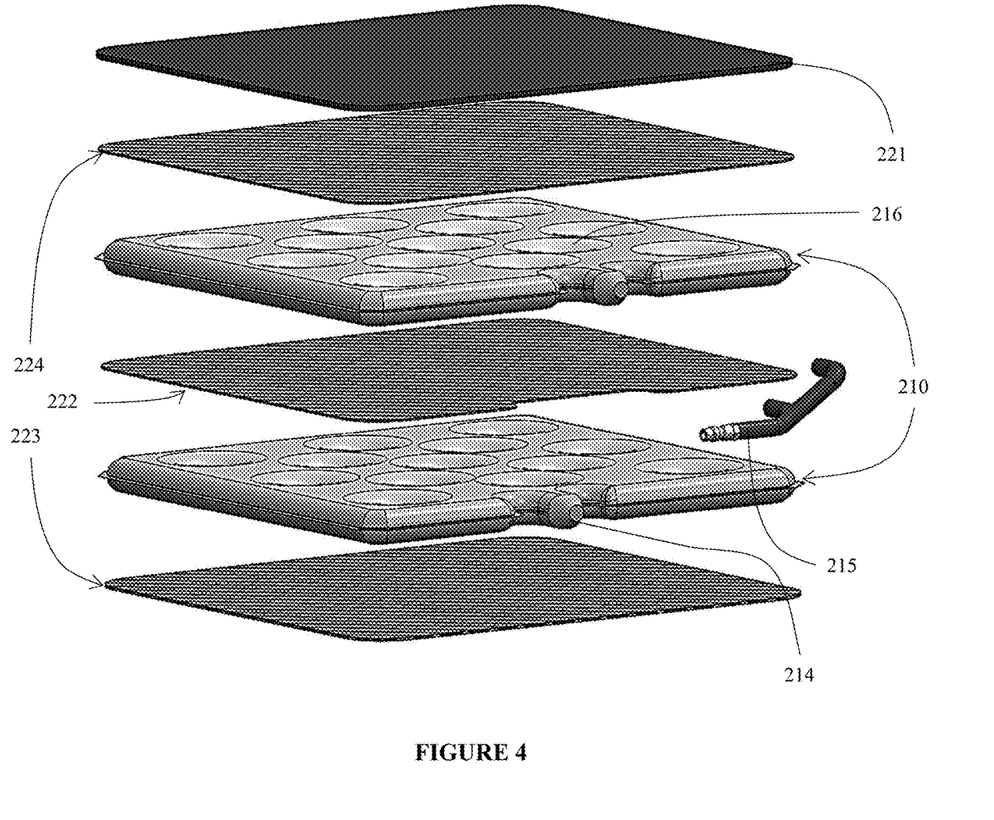
FIG. 4 is cross sectional, perspective, exploded view of the system of FIG. 3.

An additional plate 224 is also positioned between the upper airbag 211 and the mounting plate 221, while lower airbag 212 is captured between plates 222, 223. In this embodiment, plates 222, 223, 224 are substantially similar in terms of thickness, construction, and performance, so as to simplify manufacturing and lower the cost thereof.

Figure 5:
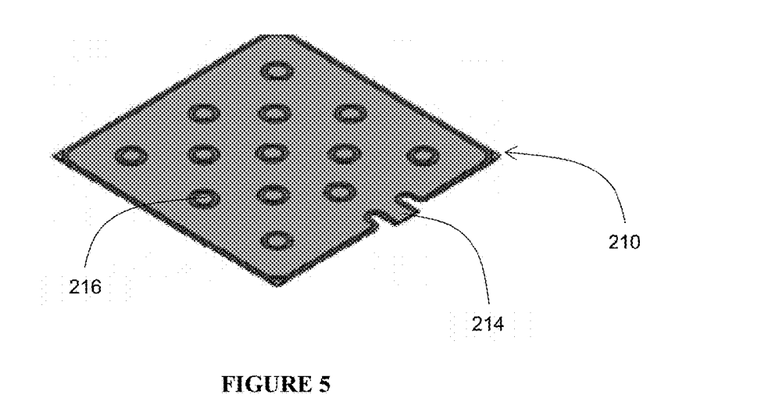
FIG. 5 is an isolated, perspective view of an airbag according to various aspects described herein.

Airbags 210 include upper bag 211 and lower bag 212, each of which is shown in its inflated state. Inlet attachment 214 is formed in each bag 210. Attachment 214 may include valves, controllers, and/or the inflation mechanism itself (e.g., an energetic combustion source relying upon gas producing/releasing chemicals such as a metal or other azide which can quickly transform from a solid into nitrogen gas upon heating via an ignitor or via compressed or pressurized vessels containing appropriate gases or fluid reactants). Preferably, attachments 214 are standardized to simplify manufacture and positioned in the middle of a peripheral edge of the bags 210 so as to allow for quick and even dispersion of the gas entering the bag.

Figure 6:
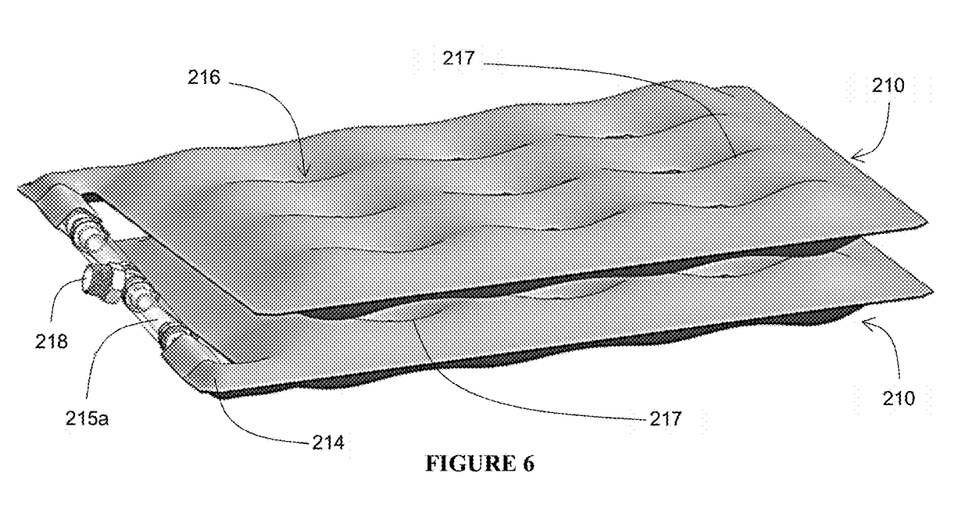
FIG. 6 is an isolated, perspective view of the fluidic connections between the top and bottom airbags, further highlighting the biasing contours provided therein.

Manifold connector 215 may be connected to the attachments 214 of each air bag 211, 212. In this manner, a single inflation mechanism can be employed, thereby ensuring the entire system 200 deploys simultaneously. The inflation mechanism may be sealed within the manifold, each airbag, or fluidically connected air bags. If the inflation mechanism is exterior to the manifold or airbags, one or more check valves can be employed to admit gas into the system without substantial, unwanted deflation during its operation.

Recesses or indents 216 may be provided within the planar space defined by airbags 210. These indents 216 cooperate with the plates 220 to allow for more efficient force absorption. In particular, indents 216 allow the bag 210 to elastically deform into the void originally defined by each indent 216. Additionally or alternatively, bags 210 may have a wavy contour 217 (as best seen in FIG. 6). Contours 217 provide further force absorption by flexible deforming. In this regard, contours 217 effectively act as biasing members when absorbing these forces. Similar features may be employed across the facings of the semi-rigid plates as described above (and vice versa).

Finally, also as seen in FIG. 6, airbags 210 may have inlet attachments 214 positioned at a corner. The bags 210 may be identical in construction but inverted relative to one another so as to space apart the attachments 214. Manifold 215a can then be formed as a single pipe or fashioned integrally from the same materials used to construct the airbags 210, with valving and controls positioned centrally within that pipe so as to ensure quick, effective, and evenly distributed activation if/when the inflation mechanism is triggered. Alternatively, a single outlet 218 from the manifold 215a attaches to the inflation mechanism. Also, wavy contours 217 are formed as alternating ridges positioned between indents 216 in each bag 210.

In view of the foregoing, an assortment of embodiments are contemplated to distribute deceleration forces incurred by a point load (i.e., an acute contact with the airbag along a small portion of its surface area). These forces are distributed by a closed system, in which pressure does not intentionally decrease in the airbags (i.e., the airbags do not intentionally deflate). As such, the system may handle repeated impacts as might be expected in a rollover crash or other scenarios where quick and repeated blows must be absorbed, all of which stand in stark contrast to conventional airbags designed for pressure gradient deflation and one-time use (i.e., they can only dissipate impact forces a single time).

In particular, at least three embodiments are contemplated. The first is a closed airbag system with at least two airbags, each airbag having substantially planar facings oriented orthogonally relative to a thickness of each bag; a semi-rigid force distributing plate interposed between the at least two airbags and conforming to adjacent planar facings of each of the at least two airbags; and wherein the at least two airbags and the semi-rigid force distributing plate are held in close proximity and wherein a surface area of each planar facing is an order of magnitude larger than the thickness of each bag. Other embodiments contemplate an airbag system for distributed deceleration of point load forces (particularly those caused by vehicle impacts) where the main features include either a first inflatable airbag; a second inflatable airbag; and a semi-rigid force distributing plate interposed between the first and second airbags; or a plurality of inflatable airbags arranged in a stack with at least one semi-rigid force distribution plate interposed between adjacent planar surfaces of each inflatable airbag in the stack wherein the plurality of inflatable airbags are configured to: (i) inflate at approximately the same time and (ii) retain inflating fluid so as to sustain multiple point load impact forces over a period of time. Optionally, any one of these embodiments may include one or any combination of the following features:

a second semi-rigid force distributing plate positioned on an outer facing of a first of the at least two airbags;
a third semi-rigid force distributing plate positioned on an outer facing of a second of the at least two airbags;
a mounting plate positioned on an outermost facing of a first of the at least two airbags;
an inflation mechanism fluidically connected to the at least two airbags;
wherein the semi-rigid plate is a laminate plate;
wherein the semi-rigid plate is resilient;
wherein the semi-rigid plate is elastically deformable;
wherein the inflation mechanism is connected to the at least two airbags by a manifold;
wherein the manifold is integrally formed with the at least two airbags from an identical material as an encasing material found in each of the at least two airbags;
wherein the inflation mechanism is selected from an energetic combustion source and a compressed or pressurized fluid source;
wherein the inflation mechanism is provided within: (i) the at least two airbags or (ii) a manifold fluidically connected to the at least two airbags;
wherein the at least two airbags and the semi-rigid plate are shaped to conform to a vehicle surface;
wherein the vehicle surface is an interior facing of roof panel;
wherein at least one of the planar facings includes at least one of recesses, indents, or contours;
wherein the semi-rigid plate includes at least one of recesses, indents, or contours;
wherein the semi-rigid plate has a first and second contact surface on opposing facings such that each contact facing abuts a planar surface associated with separate airbags;
wherein the contact surface on each opposing facing has a surface area that is substantially similar to the surface area of the airbag(s);
wherein the first and second contact surfaces have identical shapes for each contact surface; and
wherein the semi-rigid plate has a thickness and a surface area of the contact surface is an order of magnitude larger than the thickness of the semi-rigid plate.

Although specific embodiments and advantages have been enumerated above, various other embodiments may provide some, none, or all of the features and enumerated advantages. Although exemplary embodiments are illustrated in the figures and description herein, the principles of the present disclosure may be implemented using any number of techniques, whether currently known or not. Moreover, the operations of the system and apparatus disclosed herein may be performed by more, fewer, or other components and the methods described herein may include more, fewer or other steps. Additionally, steps may be performed in any suitable order.

We claim:

1. A closed airbag system, the system comprising:
   at least two airbags, each airbag having substantially planar facings oriented orthogonally relative to a thickness of each airbag;
   a semi-rigid force distributing plate interposed between the at least two airbags and conforming to adjacent planar facings of each of the at least two airbags; and
   wherein the at least two airbags and the semi-rigid force distributing plate are held in close proximity and wherein a surface area of each planar facing is an order of magnitude larger than the thickness of each airbag.

2. The airbag system of claim 1 further comprising a second semi-rigid force distributing plate positioned on an outer facing of a first of the at least two airbags.

3. The airbag system of claim 2 further comprising a third semi-rigid force distributing plate positioned on an outer facing of a second of the at least two airbags.

4. The airbag system of claim 1 wherein the semi-rigid plate is a laminate plate.

5. The airbag system of claim 1 wherein the semi-rigid plate is resilient.

6. The airbag system of claim 1 wherein the semi-rigid plate is elastically deformable.

7. The airbag system of claim 1 further comprising an inflation mechanism fluidically connected to the at least two airbags.

8. The airbag system of claim 7 wherein the inflation mechanism is connected to the at least two airbags by a manifold.

9. The airbag system of claim 8 wherein the manifold is integrally formed with the at least two airbags from an identical material as an encasing material found in each of the at least two airbags.

10. The airbag system of claim 7 wherein the inflation mechanism is selected from an energetic combustion source and a compressed or pressurized fluid source.

11. The airbag system of claim 7 wherein the inflation mechanism is provided within:
- (i) the at least two airbags or (ii) a manifold fluidically connected to the at least two airbags.

12. The airbag system of claim 1 wherein the at least two airbags and the semi-rigid plate are shaped to conform to a vehicle surface.

13. The airbag system of claim 12 wherein the vehicle surface is an interior facing of roof panel.

14. The airbag system of claim 1 wherein at least one of the planar facings includes at least one of recesses, indents, or contours.

15. The airbag system of claim 1 wherein the semi-rigid plate includes at least one of recesses, indents, or contours.

16. The airbag system of claim 1 further comprising a mounting plate positioned on an outermost facing of a first of the at least two airbags.

17. The airbag system of claim 1 wherein the at least two airbags are configured to (i) inflate with a fluid simultaneously and/or (ii) retain the fluid so as to sustain multiple point load impact forces for a period of time after inflation.

\* \* \* \* \*